(12) United States Patent
Weber

(10) Patent No.: US 8,743,512 B2
(45) Date of Patent: Jun. 3, 2014

(54) LIMIT SWITCH INTERFACE CIRCUIT

(71) Applicant: Lear Corporation, Southfield, MI (US)

(72) Inventor: Charles Francis Weber, Dexter, MI (US)

(73) Assignee: Lear Corporation, Southfield, MI (US)

( * ) Notice: Subject to any disclaimer, the term of this patent is extended or adjusted under 35 U.S.C. 154(b) by 130 days.

(21) Appl. No.: 13/645,572

(22) Filed: Oct. 5, 2012

(65) Prior Publication Data

US 2013/0107398 A1 May 2, 2013

Related U.S. Application Data

(60) Provisional application No. 61/551,479, filed on Oct. 26, 2011.

(51) Int. Cl.
*H02H 7/00* (2006.01)

(52) U.S. Cl.
USPC ............................................................ 361/2

(58) Field of Classification Search
CPC .............................. B60N 2/4415; H02H 9/001
USPC ............................................................ 361/2
See application file for complete search history.

(56) References Cited

U.S. PATENT DOCUMENTS

| 5,619,177 | A | 4/1997 | Johnson et al. |
| 5,960,812 | A | 10/1999 | Johnson |
| 6,247,678 | B1 | 6/2001 | Hines et al. |
| 6,279,869 | B1 | 8/2001 | Olewicz |
| 6,840,257 | B2 | 1/2005 | Dario et al. |
| 7,484,528 | B2 | 2/2009 | Beyerlein et al. |
| 7,816,027 | B2 | 10/2010 | Brandon, II |
| 7,833,649 | B2 | 11/2010 | Jones et al. |

OTHER PUBLICATIONS

German Patent & Trademark Office, Office Action for the corresponding German Patent Application No. 10 2012 219 428.2 mailed Oct. 22, 2013.

*Primary Examiner* — Rexford Barnie
*Assistant Examiner* — Tien Mai
(74) *Attorney, Agent, or Firm* — Brooks Kushman P.C.

(57) ABSTRACT

A circuit for interfacing to a limit switch configured to be closed when a wire connected to the limit switch is relatively hot and configured to be opened when the wire is relatively cold includes an input, an output, and a control portion. The input is configured to receive a pulse width modulated (PWM) signal having a duty cycle with a high pulse and a low pulse. The output is configured to apply the PWM signal to an external transistor associated with the wire, and a control portion. The high pulse actuates heating of the wire when the high pulse is applied to the external transistor. The control portion is configured to cause voltage across the limit switch to be substantially zero, whereby arcing of the limit switch is relatively minimal, when the limit switch closes while the high pulse is being applied to the external transistor.

20 Claims, 4 Drawing Sheets

LIMIT SWITCH INTERFACE CIRCUIT

CROSS-REFERENCE TO RELATED APPLICATIONS

This application claims the benefit of U.S. Provisional Application No. 61/551,479, filed Oct. 26, 2011; the disclosure of which is incorporated in its entirety by reference herein.

TECHNICAL FIELD

The present invention relates to an interface circuit for a limit switch.

BACKGROUND

Certain vehicle seat modules control the air pressure inside multiple bladders. One or more of the bladders is located under the surface of a vehicle seat. The contour of the seat is modified with changing pressure. Certain modules may employ air valve technology which internally uses a shape memory alloy (SMA) wire to actuate the valve. When heated, the SMA property causes the wire to shrink and thereby open the valve.

The valve technology includes a limit switch. The limit switch is used to sense when the valve is in its full opened position. The valve is in its full opened position while the wire is adequately heated such that the wire is shrunk enough to thereby open the valve to its full opened position. The limit switch is closed when the valve is in its full opened position. As such, by detecting that the limit switch is closed it can be detected that the valve is in its full opened position. The valve is not in its full opened position while the wire is not adequately heated. The limit switch is not closed (e.g., the limit switch is opened) when the valve is not in its full opened position. As such, by detecting that the limit switch is opened it can be detected that the valve is not in its full opened position.

Using the limit switch to sense the position of the valve permits control circuits to maintain the valve in its full opened position while applying further minimal heat to the wire. This level of control provides predictable behavior of the valve over varying temperature and air flow conditions and also minimizes the heat and mechanical stress on the wire.

Pulse Width Modulation (PWM) may be used for heating the wire. Current pulses are passed through the wire with resistivity losses of the wire causing self-heating of the wire. The PWM current pulses can be generated by a microcontroller for application to the wire.

SUMMARY

Embodiments of the present invention are directed to an electronic circuit for interfacing to a limit switch. The switch is used in an application for heating a wire such as a shape memory alloy (SMA) wire. An electronic circuit (i.e., a "limit switch interface circuit" or "switch interface circuit") in accordance with embodiments of the present invention is intended to reduce operating current and minimize commutation thereby extending life of the switch. Previous designs commutate the switch circuit load current through the switch for each open-close event as part of the normal operation. A concern is that the low-voltage micro-arching may prematurely wear out the sensitive contacts of the switch. An electronic circuit in accordance with embodiments of the present invention uses transistors to commutate the switch current and may thereby nearly eliminate the low-voltage micro-arching. In this manner, the switch state (i.e., opened or closed) pursuant to the use of an electronic circuit in accordance with embodiments of the present invention is better described as being sampled rather than driving the response load circuit as per the previous designs.

In an embodiment, a circuit for interfacing to a limit switch is provided. The limit switch is configured to be closed when a wire connected to the limit switch is relatively hot and configured to be opened when the wire is relatively cold. The circuit includes an input, an output, and a control portion. The input is configured to receive a pulse width modulated (PWM) signal having a duty cycle with a high pulse and a low pulse. The output is configured to apply the PWM signal to an external transistor associated with the wire, and a control portion. The high pulse actuates heating of the wire when the high pulse is applied to the external transistor. The control portion is configured to cause voltage across the limit switch to be substantially zero, whereby arcing of the limit switch is relatively minimal, when the limit switch closes while the high pulse is being applied to the external transistor.

In an embodiment, an assembly having a wire, a limit switch, and a circuit is provided. The wire is configured to move a valve to a fully opened position when the wire is relatively hot, the wire being associated with an external transistor. The limit switch is movable to and from a closed position, wherein the limit switch is configured to be in the closed position when the valve is in the fully opened position. The circuit interfaces to the limit switch and includes an input, an output, and a control portion. The input is configured to receive a pulse width modulated (PWM) signal having a duty cycle with a high pulse and a low pulse. The output is configured to apply the PWM signal to an external transistor associated with the wire. The high pulse actuates heating of the wire when the high pulse is applied to the external transistor. The control portion is configured to cause voltage across the limit switch to be substantially zero, whereby arcing of the limit switch is relatively minimal, when the limit switch closes while the high pulse is being applied to the external transistor.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
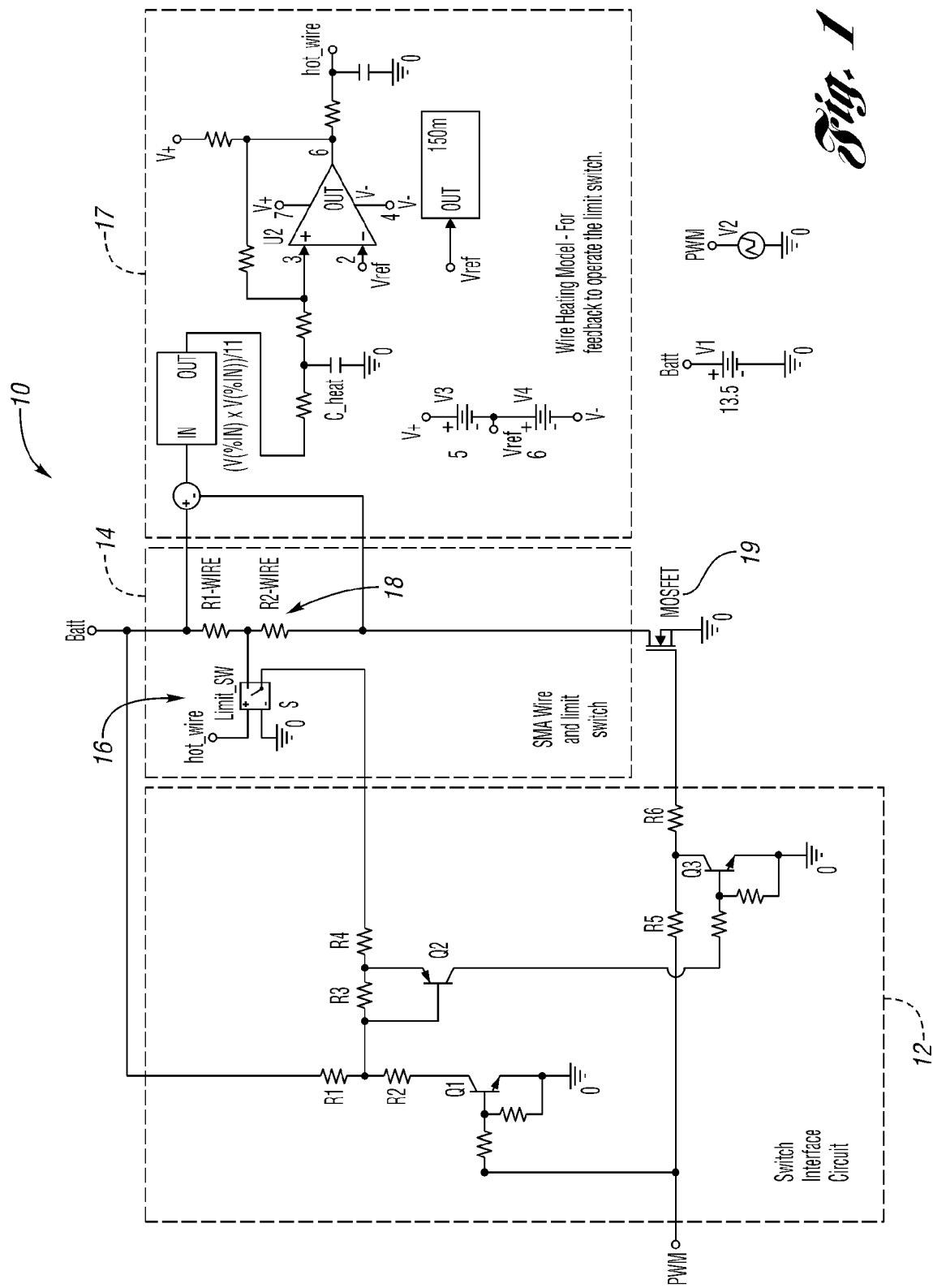
FIG. 1 illustrates a schematic diagram of an assembly having a limit switch interface circuit in accordance with a first embodiment of the present invention.

Referring now to FIG. 1, an assembly 10 having a limit switch interface circuit 12 in accordance with a first embodiment of the present invention is shown. Assembly 10 further includes a sub-assembly 14 having a limit switch 16 and a shape memory alloy (SMA) wire 18. Assembly 10 further includes a wire heating model sub-assembly 17 for providing feedback to operate limit switch 16. Wire heating model sub-assembly 17 is used for simulation purpose.

Limit switch and SMA wire sub-assembly 14 represents limit switch 16 and SMA valve wire 18. Wire 18 is denoted by the sum of the resistances R1-Wire and R2-Wire. Switch 16 senses voltage at a mid-point of wire 18. The mid-point is due to the mechanical construction of the valve for this particular application. Switch 16 is a normally opened-type switch. Switch 16 is closed when the valve is fully opened. The valve is fully opened while wire 18 is adequately heated such that wire 18 shrinks enough thereby causing the valve to open into its fully opened position. The valve is in a position other than its fully opened position when wire 18 is not adequately heated to shrink enough in order to open the valve to its fully opened position. Switch 16 closes upon the valve being fully opened and remains closed while the valve is fully opened. Switch 16 opens upon the valve moving from its fully opened position to another position and remains opened while the valve is in a position other than its fully opened position. In this example, switch 16 presents one-half of the voltage across wire 18 when switch 16 is closed as a result of the valve being in its fully opened position.

As described in greater detail below, a purpose of switch 16 is to interrupt Pulse Width Modulated (PWM) generated wire heating when the valve is fully opened. That is, the PWM wire heating is to be interrupted most of the time while switch 16 is closed. The PWM wire heating is interrupted by preventing the PWM signal from being presented to the gate of a MOSFET 19 (or for example, a bipolar junction transistor (BJT)) connected to the wire.

Conversely, the PWM wire heating is to be enabled when the valve is in a position other than its fully opened position (i.e., when switch 16 is not closed). That is, the PWM wire heating is enabled when switch 16 is opened. The PWM wire heating is enabled by allowing the PWM signal to be presented to the gate of MOSFET.

Limit switch interface circuit 12 includes a first transistor Q1, a second transistor Q2, and a third transistor Q3. Transistors Q1, Q2, and Q3 along with associated resistive components including resistors R1, R2, R3, R4, R5, and R6 are arranged in the configurations shown in FIG. 1. The PMW signal is input to transistor Q1 and transistor Q3 componentry as shown in FIG. 1. Transistor Q2 componentry is electrically connected to switch 16 as shown in FIG. 1. Transistor Q3 componentry is electrically connected to the gate of MOSFET 19 as shown in FIG. 1.

A function of limit switch interface circuit 12 is to allow the state of switch 16 to be communicated to the PWM signal stream for control of heating or cooling of wire 18. Another function of interface circuit 12 is to minimize the commutation of current passing through switch 16 thereby extending the life of switch 16. Commutation of current occurs when switch 16 actively initiates or terminates current flowing through switch 16. This causes micro-arcing at the switch contacts at the instant of closing or opening resulting in wear.

In a typical application, the PWM duty cycle may be 10%. A fundamental principle of reducing the current commutation of switch 16 is to recognize that information about the state (e.g., closed or opened) of switch 16 is only required when the PWM pulse is logic high. Heating of wire 18 occurs when the PWM high pulse is applied to the gate of MOSFET 19. As such, wire 18 is not heated during the PWM high pulse if the PWM high pulse is not applied to the gate of MOSFET 19. Wire 18 is not heated when the PWM pulse is logic low regardless of whether the PWM low pulse is applied to the gate of MOSFET 19. As such, in the typical application where the PWM duty cycle is 10% the information about the state of switch 16 is only required 10% of the time. That is, when the PWM pulse is high, which occurs 10% of the time in this example, the information about the switch state is needed as heating of the wire can occur with the PWM high pulse. Conversely, when the PWM pulse is low (i.e., logic zero), which occurs 90% of the time in this example, the information about the switch state is not needed as no heating will occur with the PWM low pulse.

One operation of limit switch interface circuit 12 in reducing the commutation is to keep the switch electrical load disconnected during the time the PWM pulse is at logic low, 90% of the time in this example. Additional operations are implemented by interface circuit 12 to reduce switch commutation while the PWM pulse is logic high, 10% of the time in this example.

The Limit Switch Commutation Current Is Minimized: Cases #1-Cases #5.

Case #1: The PWM signal is at logic low causing transistor Q1 of limit switch interface circuit 12 to be off. At any moment whenever switch 16 opens from its closed position due to the cooling down of wire 18 from the adequately heated position, no switch current flows and no switch commutation or micro-arcing occurs. This is because the base-emitter of transistor Q2 has zero bias voltage or has negative bias depending on the state of the output of MOSFET 19.

Case #2: Wire 18 is adequately heated and does not require additional heat (and the valve is fully opened with switch 16 being closed). While switch 16 is closed, at the moment the PWM signal transitions to logic high current flows through switch 16 but will not be commutated. There is no micro-arcing within switch 16 as switch 16 is already closed. In this case, the base-emitter of transistor Q2 becomes forward biased causing conduction to the base of transistor Q3. The speed of this transaction is fast compared to the turn-on time of MOSFET 19 due to the gate capacitance and limiting resistors R5 and R6. This causes transistor Q3 to clamp the node between resistors R5 and R6 to ground thereby preventing the PWM signal from being applied to the gate of MOSFET 19. As the PWM signal is prevented from enabling MOSFET 19, further heating of wire 18, which is already adequately heated, is blocked.

Case #3: Wire 18 requires heating as the valve is not fully opened (and the switch 16 is opened). Wire heating is initiated at the start of a PWM high pulse as switch 16 is opened. In this case, transistor Q2 and wire 18 are on. The resistor divider R1-R2 is active causing both sides of switch 16 to have the same voltage, namely, the midpoint voltage across wire 18. (The voltage divider R1 and R2 are chosen to approximate the voltage divider R1-Wire and R2-Wire.) Upon wire 18 being adequately heated such that switch 16 closes during the PWM high pulse, no current flows and no commutation occurs according to the case #2 above.

Case #4: Wire 18 is adequately heated at the start of a PWM high pulse, but cools off enough during the PWM high pulse such that wire 18 needs to be heated further. In this case, switch 16 is closed at the start of the PWM high pulse, but opens during the PWM high pulse thereby calling for heating of wire 18. This is the same as case #2 until switch 16 opens. This situation causes switch commutation, but is relatively rare. This situation is rare due to the typically small 10% duty cycles. Commutation does occur, but has been minimized.

Further, some of those skilled in the art may consider that limited commutation is necessary to clean films or other minor contamination from switch 16.

Case #5: Switch 16 opens or closes right on the edge of a PWM pulse. This situation is neglected as the PWM transition times occupy a relatively extremely small part of the PWM period thereby making this situation rare.

As described by the cases, features of switch interface circuit 12 is to prevent the arcing across switch 16. To this end, interface circuit 12 is configured such that: (i) when switch 16 closes to terminate heating while wire heating is on, the voltage across switch 16 is small and arcing is minimal; (ii) when switch 16 opens to call for heating while the wire heating is off, the voltage across switch 16 is small and minimal arcing occurs; and (iii) if limit switch 16 were to close, due to delayed response of the heated wire, while wire heating is off, still the voltage across switch 16 is minimal.

As described, limit switch interface circuit 12 allows switch 16 to effectively be "sampled" in hardware by the PWM signal for wire heating control while minimizing current commutation at the switch contacts to thereby extend the life of switch 16.

Figure 2:
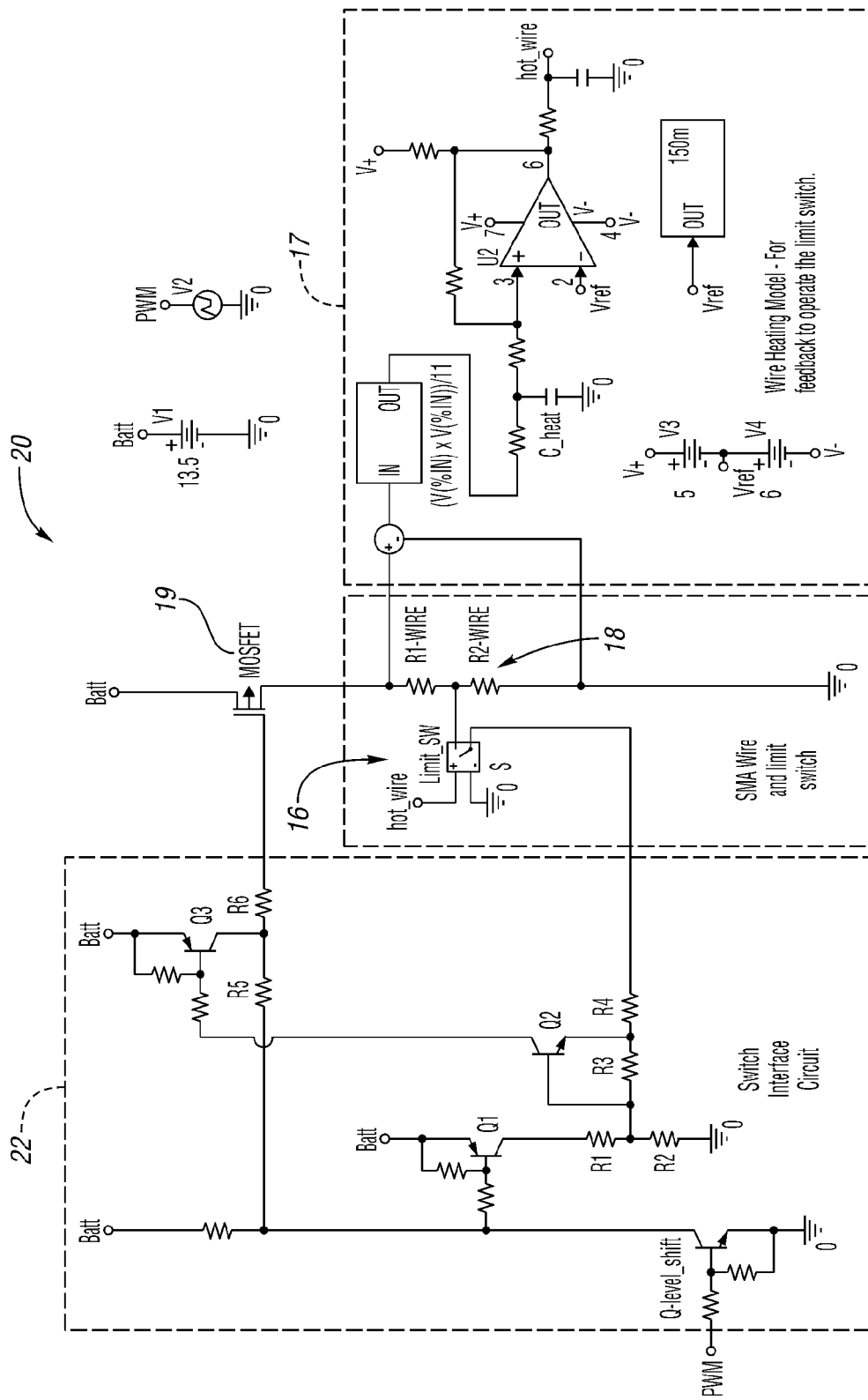
FIG. 2 illustrates a schematic diagram of an assembly having a limit switch interface circuit in accordance with a second embodiment of the present invention.

Referring now to FIG. 2, with continual reference to FIG. 1, an assembly 20 having a limit switch interface circuit 22 in accordance with a second embodiment of the present invention is shown. Assembly 20 includes limit switch and SMA wire sub-assembly 14 and wire heating model sub-assembly 17. Limit switch and SMA wire sub-assembly 14 includes limit switch 16 and SMA wire 18.

Limit switch interface circuit 22 is an alternate embodiment if "high-side" drive of wire 18 is desired. Interface circuit 22 includes a transistor Q-level_shift, a first transistor Q1, a second transistor Q2, and a third transistor Q3. Transistors Q-level_shift, Q1, Q2, and Q3 along with associated resistive components including resistors R1, R2, R3, R4, R5, and R6 are arranged in the configurations shown in FIG. 2. The PMW signal is input to transistor Q-level_shift as shown in FIG. 2. Transistor Q2 componentry is electrically connected to switch 16 as shown in FIG. 2. Transistor Q3 componentry is electrically connected to the gate of MOSFET 19 as shown in FIG. 2.

Limit switch interface circuits in accordance with other embodiments may include replacing MOSFET 19 with a suitable bi-polar device and appropriate bias circuits.

Figure 3:
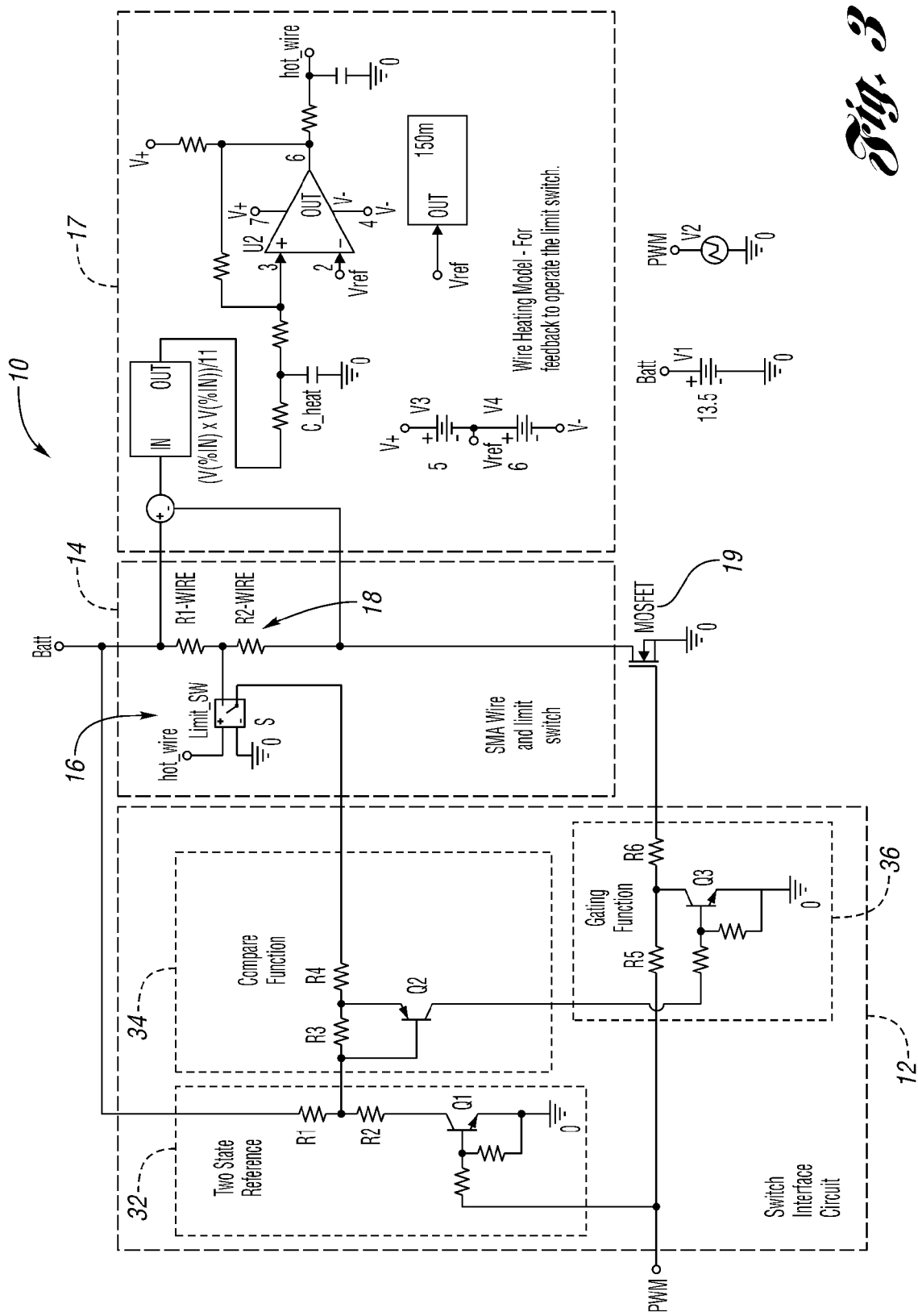
FIG. 3 illustrates a schematic diagram of the assembly shown in FIG. 1 with a generalized functional description diagram of the limit switch interface circuit.

Referring now to FIG. 3, with continual reference to FIG. 1, a schematic diagram of assembly 10 shown in FIG. 1 with a generalized functional description diagram of limit switch interface circuit 12 is shown. As shown in FIG. 3, the electrical componentry of interface circuit 12 form a two-state reference block 32, a compare function block 34, and a gating function block 36.

Transistor Q1 and resistors R1 and R2 form two-state reference block 32. Two-state reference block 32 provides a PWM switchable two-state reference voltage with a first voltage representing the wire heat-off state of the mid-value voltage of wire 18 and a second voltage representing the wire heat-on state of the mid-value voltage of wire 18.

Transistor Q2 and resistors R3 and R4 form compare function block 34. Compare function block 34 provides a comparator function for comparing the switchable reference voltage of two-state reference block 32 to the mid-value voltage of wire 18 based on the state (i.e., closed or opened) of switch 16.

Transistor Q3 and resistors R5 and R6 form gating function block 36. Gating function block 36 provides a gating function to enable or disable the operation of MOSFET 19 based on the comparator output function of compare function block 34 and the PWM stream.

Figure 4:
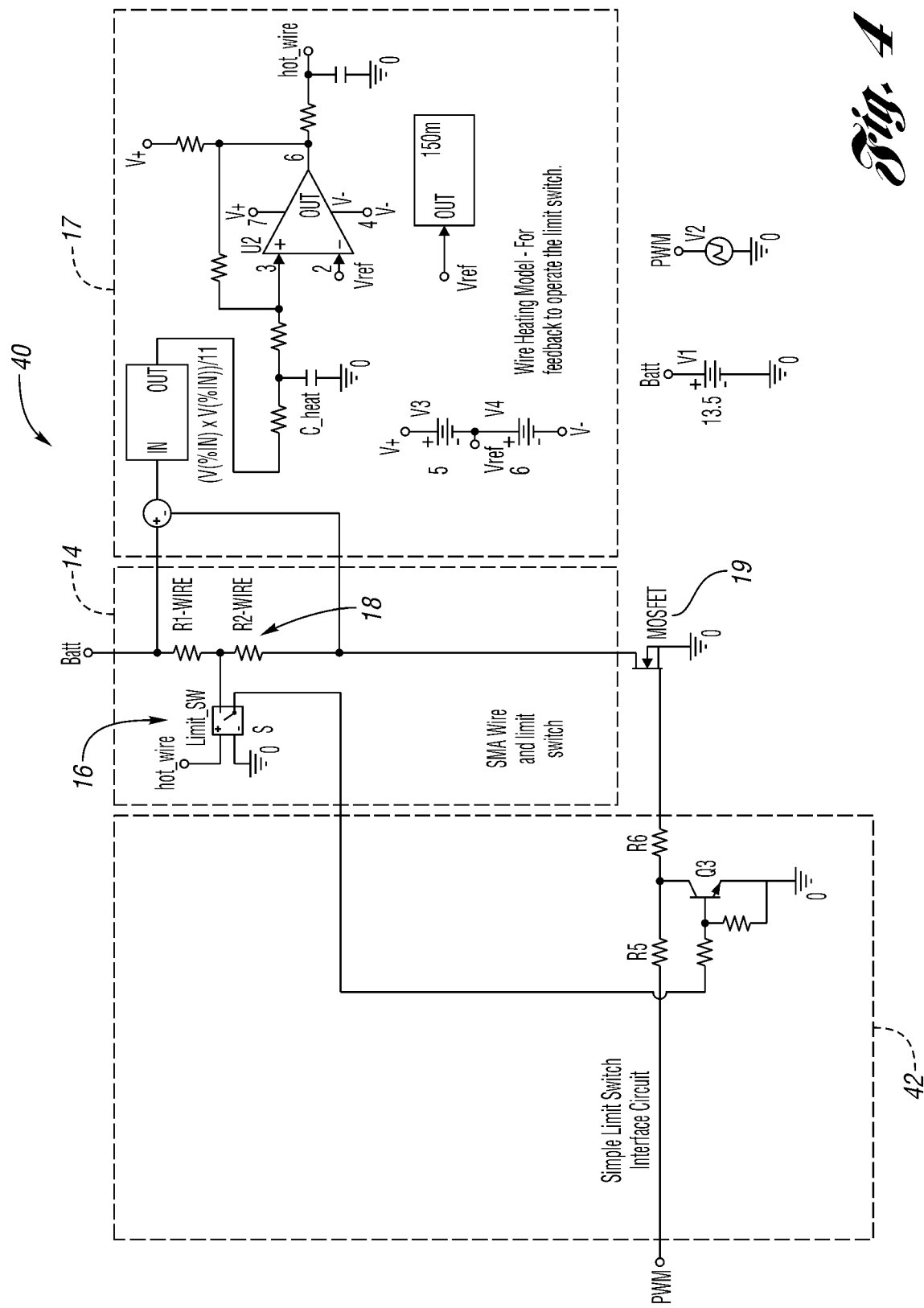
FIG. 4 illustrates a schematic diagram of an assembly having a simple limit switch interface circuit.

Referring now to FIG. 4, a schematic diagram of an assembly 40 having a simple limit switch interface circuit 42 is shown. Interface circuit 42 includes only the PWM gating function (enable/disable operation) of MOSFET 19. In this case, switch 16 commutates the current for all switch state transitions for all conditions. While simple, limit switch interface circuit 42 causes accelerated wear-out over limit switch interface circuits 12 and 22 described above.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A circuit for interfacing to a limit switch configured to be closed when a wire connected to the limit switch is relatively hot and configured to be opened when the wire is relatively cold, the circuit comprising:
   an input configured to receive a pulse width modulated (PWM) signal having a duty cycle with a high pulse and a low pulse;
   an output configured to apply the PWM signal to an external transistor associated with the wire, wherein the high pulse actuates heating of the wire when the high pulse is applied to the external transistor; and
   a control portion configured to cause voltage across the limit switch to be substantially zero, whereby arcing of the limit switch is relatively minimal, when the limit switch closes while the high pulse is being applied to the external transistor.

2. The circuit of claim 1 wherein:
   the control portion is further configured to enable the high pulse to be applied to the external transistor through completion of the high pulse.

3. The circuit of claim 2 wherein:
   the control portion is further configured to prevent succeeding high pulses from being applied to the external transistor while the limit switch is closed after the limit switch was closed while the high pulse was applied to the external transistor.

4. The circuit of claim 1 wherein:
   the control portion is further configured to prevent succeeding high pulses from being applied to the external transistor while the limit switch is closed after the limit switch was closed while the high pulse was applied to the external transistor.

5. The circuit of claim 1 wherein:
   the low pulse does not actuate heating of the wire when the low pulse is applied to the external transistor;
   wherein the control portion is further configured to cause the voltage across the limit switch to be substantially zero, whereby arcing of the limit switch is relatively minimal, when the limit switch opens while the low pulse is being applied to the external transistor.

6. The circuit of claim 1 wherein:
   the low pulse does not actuate heating of the wire when the low pulse is applied to the external transistor;
   wherein the control portion is further configured to cause the voltage across the limit switch to be substantially zero, whereby arcing of the limit switch is relatively minimal, when the limit switch closes while the low pulse is being applied to the external transistor.

7. The circuit of claim 1 wherein:
the control portion is further configured to enable the high pulse to be applied to the external transistor while the limit switch is opened.

8. The circuit of claim 1 wherein:
the low pulse does not actuate heating of the wire when the low pulse is applied to the external transistor;
the control portion is further configured to enable the low pulse to be applied to the external transistor while the limit switch is either closed or opened.

9. The circuit of claim 1 wherein:
the control portion is configured to generate a reference voltage while the PWM signal has the high pulse;
wherein the control portion is further configured to receive a sensed voltage based on the state of the limit switch, wherein the sensed voltage is greater than the reference voltage when the limit switch is closed;
wherein the control portion is further configured to compare the sensed voltage to the reference voltage and prevents the high pulse from being applied to the external transistor in response to the sensed voltage being greater than the reference voltage while the limit switch is closed after the limit switch was closed while the high pulse was applied to the external transistor.

10. The circuit of claim 9 wherein:
the control portion is further configured to apply the high pulse to the external transistor in response to the sensed voltage not being greater than the reference voltage.

11. The circuit of claim 10 wherein the reference voltage is a first reference voltage, wherein:
the control portion is further configured to generate a second reference voltage while the PWM signal has the low pulse;
wherein the sensed voltage is less than the second reference voltage when the limit switch is closed;
wherein the control portion is further configured such that the low pulse may be applied to the external transistor in response to the sensed voltage being less than the second reference voltage.

12. The circuit of claim 11 wherein:
the control portion includes a two-state reference voltage generation portion having a first transistor and a first resistor arrangement configured to generate the first reference voltage while the PWM signal has the high pulse and to generate the second reference voltage while the PWM signal has the low pulse.

13. The circuit of claim 12 wherein:
the control portion further includes a comparator portion having a second transistor and a second resistor arrangement configured to compare the sensed voltage to the reference voltages;
wherein the control portion further includes a gating portion having a third transistor and a third resistor arrangement configured to prevent the high pulse from being applied to the external transistor when the sensed voltage is greater than the first reference voltage and to apply the high pulse to the external transistor when the sensed voltage is not greater than the first reference voltage.

14. An assembly comprising:
a wire configured to move a valve to a fully opened position when the wire is relatively hot, the wire being associated with an external transistor;
a limit switch movable to and from a closed position, wherein the limit switch is configured to be in the closed position when the valve is in the fully opened position; and
a circuit for interfacing to the limit switch, the circuit including
an input configured to receive a pulse width modulated (PWM) signal having a duty cycle with a high pulse and a low pulse;
an output configured to apply the PWM signal to an external transistor associated with the wire, wherein the high pulse actuates heating of the wire when the high pulse is applied to the external transistor; and
a control portion configured to cause voltage across the limit switch to be substantially zero, whereby arcing of the limit switch is relatively minimal, when the limit switch closes while the high pulse is being applied to the external transistor.

15. The assembly of claim 14 wherein:
the control portion of the circuit is further configured to enable the high pulse to be applied to the external transistor through completion of the high pulse;
wherein the control portion of the circuit is further configured to prevent succeeding high pulses from being applied to the external transistor while the limit switch is closed after the limit switch was closed while the high pulse was applied to the external transistor.

16. The assembly of claim 14 wherein:
the low pulse does not actuate heating of the wire when the low pulse is applied to the external transistor;
wherein the control portion of the circuit is further configured to cause the voltage across the limit switch to be substantially zero, whereby arcing of the limit switch is relatively minimal, when the limit switch opens while the low pulse is being applied to the external transistor.

17. The assembly of claim 14 wherein:
the low pulse does not actuate heating of the wire when the low pulse is applied to the external transistor;
wherein the control portion of the circuit is further configured to cause the voltage across the limit switch to be substantially zero, whereby arcing of the limit switch is relatively minimal, when the limit switch closes while the low pulse is being applied to the external transistor.

18. The assembly of claim 14 wherein:
the wire is associated with a valve movable to and from a fully opened position, wherein the wire is configured to move the valve to the fully opened position when the wire is hotter than the threshold temperature such that the limit switch is closed when the valve is in the fully opened position.

19. The assembly of claim 14 wherein:
the wire is a shape memory alloy (SMA) wire.

20. The assembly of claim 14 wherein:
the external transistor is one of a MOSFET and a BJT.

* * * * *